Feb. 19, 1929.                                                    1,702,314
D. RANKINE ET AL
ENDLESS BELT CONVEYER AND ELEVATOR
Filed April 16, 1927                6 Sheets-Sheet 1
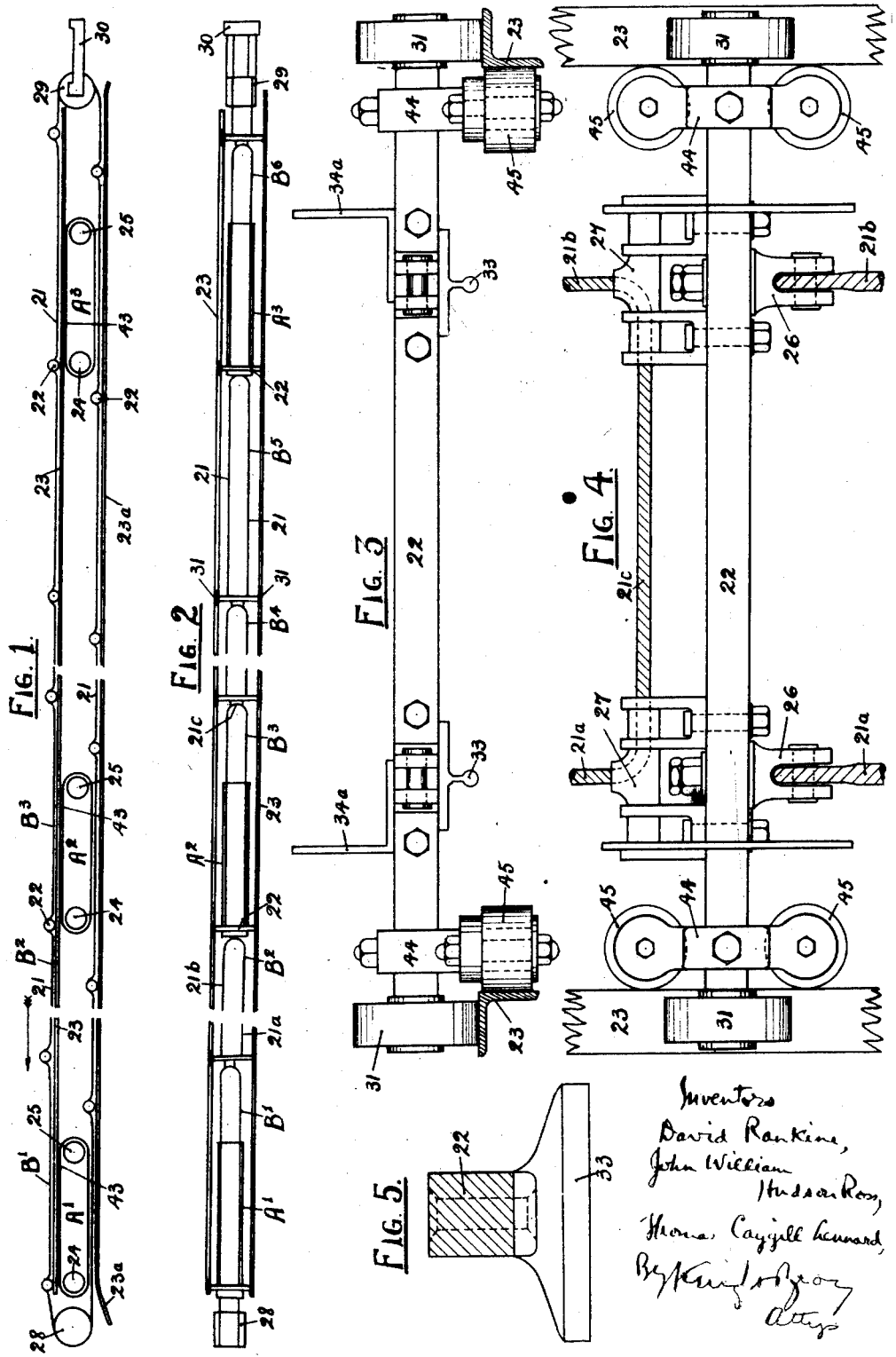

Feb. 19, 1929. 1,702,314
D. RANKINE ET AL
ENDLESS BELT CONVEYER AND ELEVATOR
Filed April 16, 1927 6 Sheets-Sheet 2
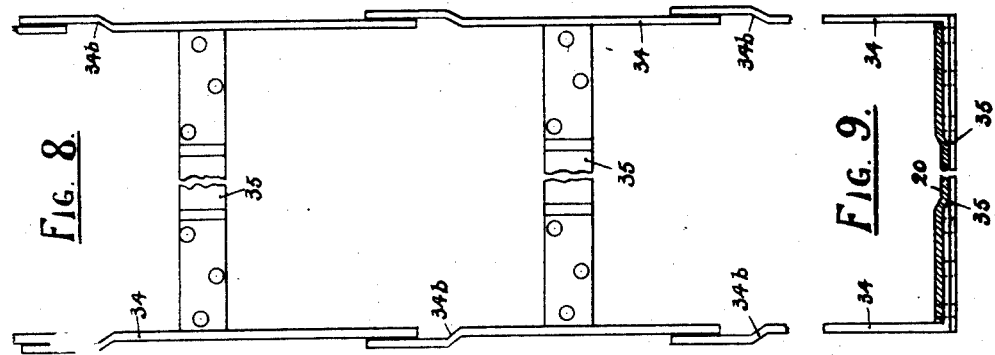
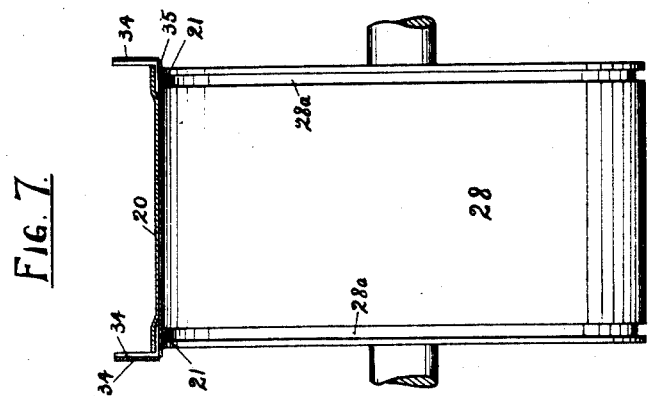
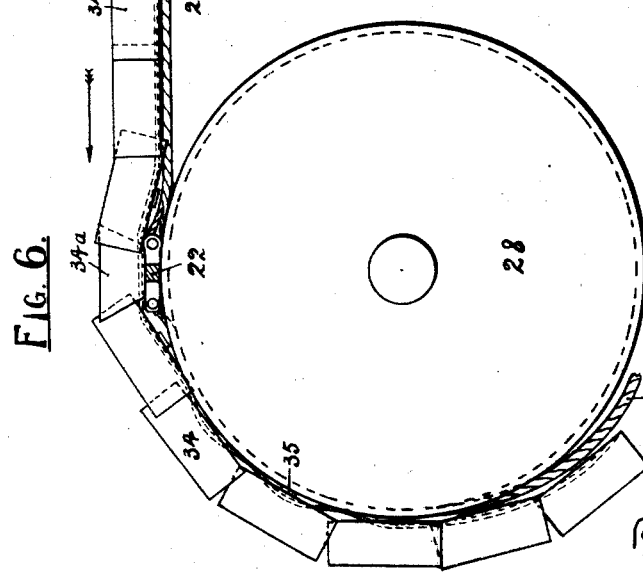

Feb. 19, 1929.　　　　　　　　　　　　　　　　　　　　1,702,314
D. RANKINE ET AL
ENDLESS BELT CONVEYER AND ELEVATOR
Filed April 16, 1927　　　　6 Sheets-Sheet 3
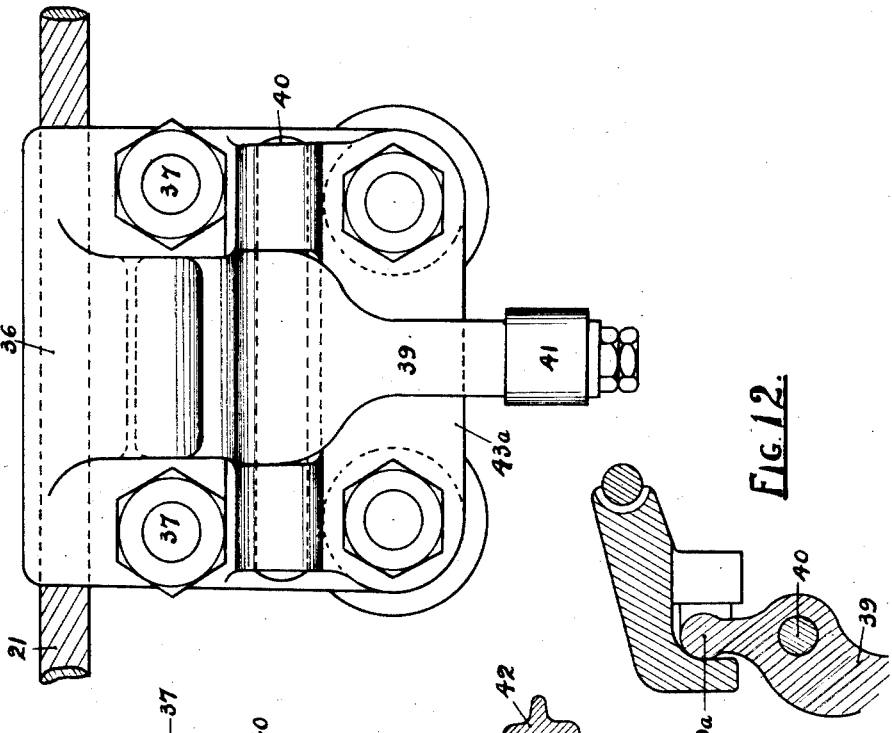
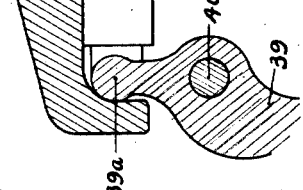
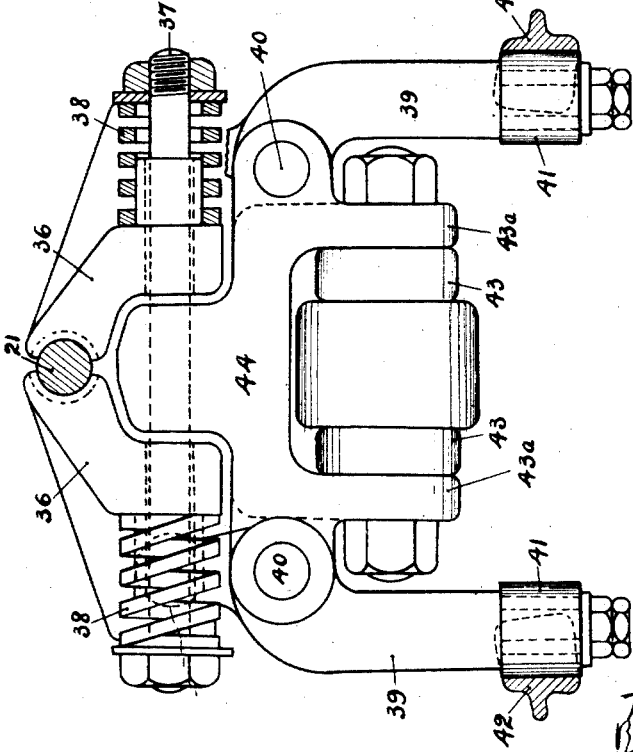

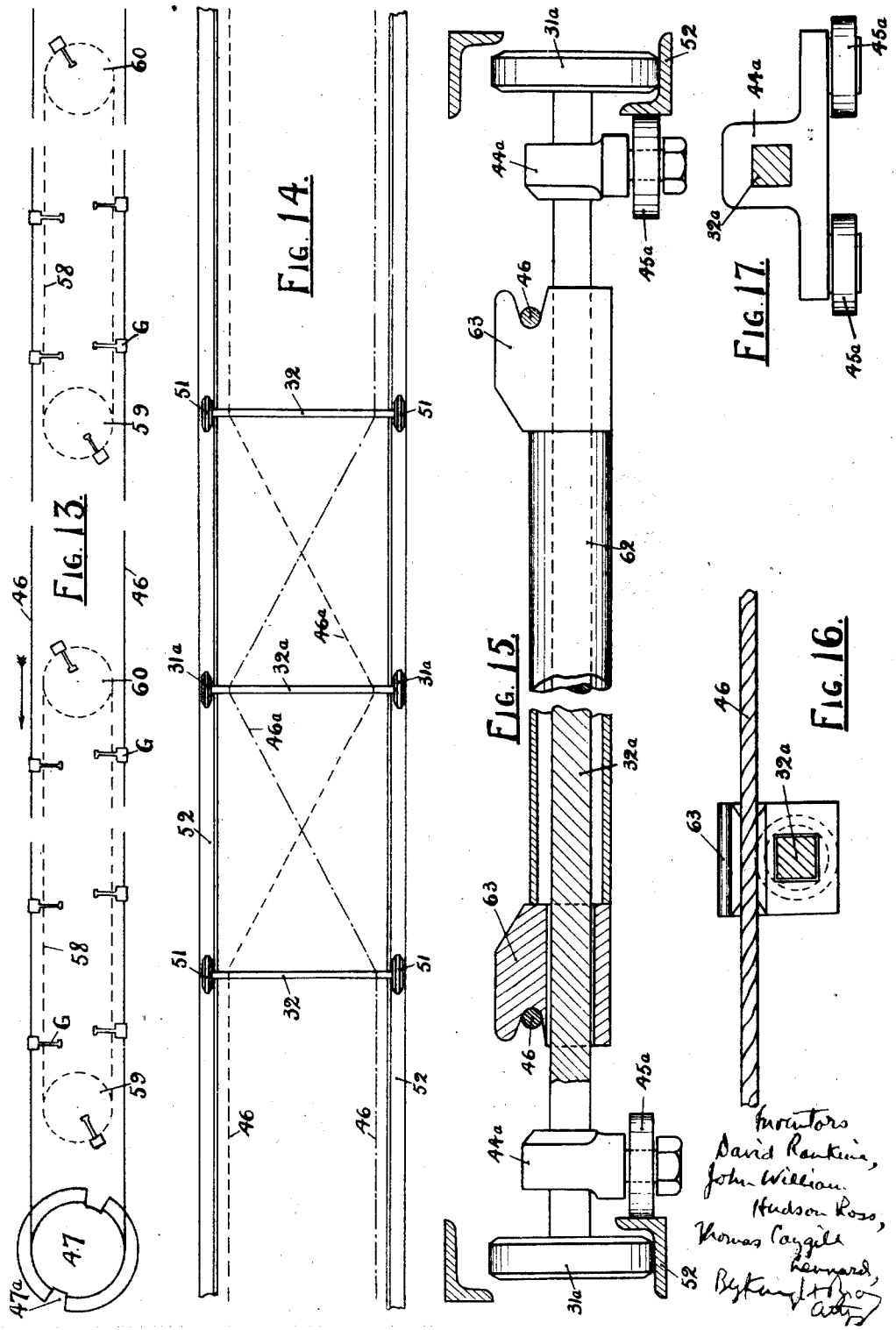

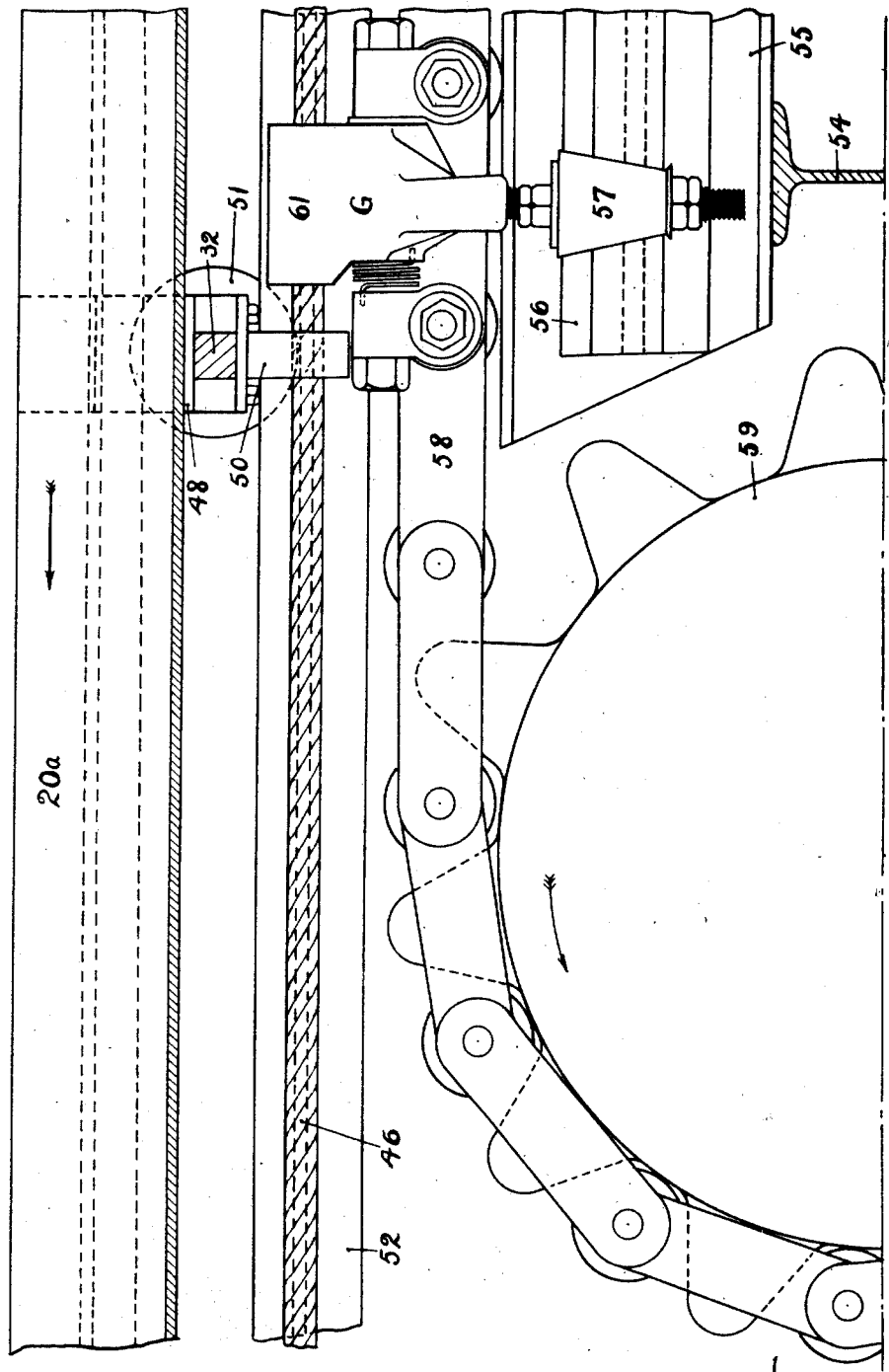

Patented Feb. 19, 1929.

1,702,314

UNITED STATES PATENT OFFICE.

DAVID RANKINE, JOHN WILLIAM HUDSON ROSS, AND THOMAS CAYGILL LENNARD, OF GLASGOW, SCOTLAND.

ENDLESS-BELT CONVEYER AND ELEVATOR.

Application filed April 16, 1927, Serial No. 184,423, and in Great Britain July 30, 1926.

This invention relates to endless belt conveyers and elevators for transporting large quantities of material, such as in the transport of materials from the working face to the surface of mines, collieries, quarries and the like, and the object of the present invention is to combine the advantages of endless belt transport with the advantages of rope haulage.

In the usual haulage system, ropes are employed to draw loaded tubs or wagons to the surface and to return the empties for refilling, whilst in the conveyer system, an endless belt is used as a carrying medium for the material and also for transmitting the necessary power for transporting the load, such belts being usually made of a number of sections of cotton duck to transmit the power, with a wearing surface of india rubber or similar material.

According to the present invention, transmission of power through the belt is wholly or practically eliminated by supporting the belt by means of ropes which transmit the drive, whereby the belt need only be of sufficient strength to carry the load of the material, the driving load being transmitted wholly or mainly through a pair of driving ropes by means of which the belt is supported, the ropes being preferably attached to the belt, and the dead load on the belt being transmitted through the ropes to a supporting structure.

We may transmit the power to the driving ropes from one or more driving units in the form of endless chains, belts, ropes or the like.

In order to overcome any difference in the stretch of the ropes which transmit the power to the belt, provision is made for relative adjustment of the ropes. This we may accomplish by dividing each rope into sections and connecting one end of each section of one rope to the end of the corresponding section of the other rope, so that the pair of ropes is now composed of a succession of loops or U-shaped sections of rope, the bight of each loop of rope being connected to the ends of the next loop by a slip connection through which the bight of the looped rope can slip in order to allow each loop of rope to automatically adjust itself to any difference in the tension on the two limbs of the looped rope and thus balance the same. Each looped section of rope is thus capable of independent self-adjustment in length. This construction also has the advantage that shorter lengths of rope are required than when two endless ropes are used. Moreover, with two endless ropes, it is desirable that care should be taken to see that the stretch of the two ropes will be as nearly as possible the same under tension, whereas with separate looped sections of rope, the same care is not necessary, as each looped section of rope will adjust itself to any elongation under tension.

The invention broadly consists in the provision of driving ropes which pass around head and tail pulleys, an endless belt conveyer being securely attached to these ropes and being provided with means whereby the dead load on the conveyer is transmitted to a stationary framework around which the conveyer travels. The driving power is transmitted to the conveyer by the provision of one or more driving units which comprise endless chains, belts or ropes which are fitted between the upper and lower runs of the conveyer, the said endless chains being driven from any suitable power source and being provided at intervals with rope grips adapted to be engaged with and disengaged from the ropes to which the conveyer is attached, means being provided for automatically engaging and disengaging the rope grips, so that the power is transmitted from the endless chains to the ropes of the conveyer over one or more sections of the upper and lower runs of the conveyer.

The conveyer is preferably supported upon suitable carriers secured to the ropes, the carriers being mounted upon axles which carry rollers adapted to run upon the stationary supporting frame-work, which may be of steel sections built to the desired form. The dead load of the transported material is therefore carried through the endless belt, carriers, axles and rollers and transmitted to the frame. The driving load is however transmitted wholly or in great part through the ropes.

In carrying out our present invention, we prefer to attach the ends of each loop to one of the axles carrying the rollers which run upon the dead-load supporting structure and to provide each axle with one or more slip guides through or around which the bight of the next section of rope is passed in such manner that it is free to slip through or around the guide. Preferably the guides consist of fittings through which the rope is threaded.

In order to counteract the gap between the bight of each looped rope section and the ends of the next rope section, we may provide fixed fins under each axle to form a virtual continuation of each rope end and thus provide a grip for the rope grips in the event of any of the rope grips coming into action when situated between two of the looped rope sections.

The ends of each loop of rope are preferably connected to the axle by swivel connections in order to allow for any twist on the rope.

We prefer to employ a flat belt carried upon each axle and provided with side plates to act as troughs, each axle being provided with similar plates to form part of the troughing. The side plates which form the trough are connected together in pairs, preferably by a cross-bar or strap which rests upon the driving ropes. The belt passes over and is secured to the said cross-bars or traps and adjacent side plates are arranged to overlap so as to avoid gaps when the conveyer is passing over the head and tail pulleys. The head pulley is preferably formed with suitable peripheral grooves to receive the driving ropes.

In order that our invention may be more clearly understood, reference is hereinafter made to the accompanying explanatory drawings whereon:—

Fig. 1 is a diagrammatic elevation and Fig. 2 a similar plan view of a straight conveyer with three driving units, but not showing the belt.

Fig. 3 is an end view of one of the belt supporting axles and Fig. 4 is a plan view thereof. Fig. 5 is a detail view of one of the fins 33 beneath the axle.

Fig. 6 is an end view of the head pulley showing part of the conveyer thereon and Fig. 7 is a side view of the head pulley with the conveyer in section.

Fig. 8 is a plan view showing a fragment of the conveyer without the belt and Fig. 9 is a cross-sectional view through the belt and conveyer trough.

Figs. 10 and 11 are end and side views respectively of one construction of rope grip and Fig. 12 a detail sectional view thereof.

Fig. 13 is a diagrammatic side representation of an alternative construction of conveyer with endless driving ropes; the belt is not shown.

Fig. 14 is a diagrammatic plan view illustrating the method of adjusting the tension of the endless driving ropes of Fig. 13.

Fig. 15 is a detail view of the adjusting axle to a larger scale and partly in section. Figs. 16 and 17 are end views of parts thereof hereafter mentioned.

Fig. 19 is a side view of a fragment of the conveyer and its driving mechanism adjacent one of the driving sprockets.

Figure 18:
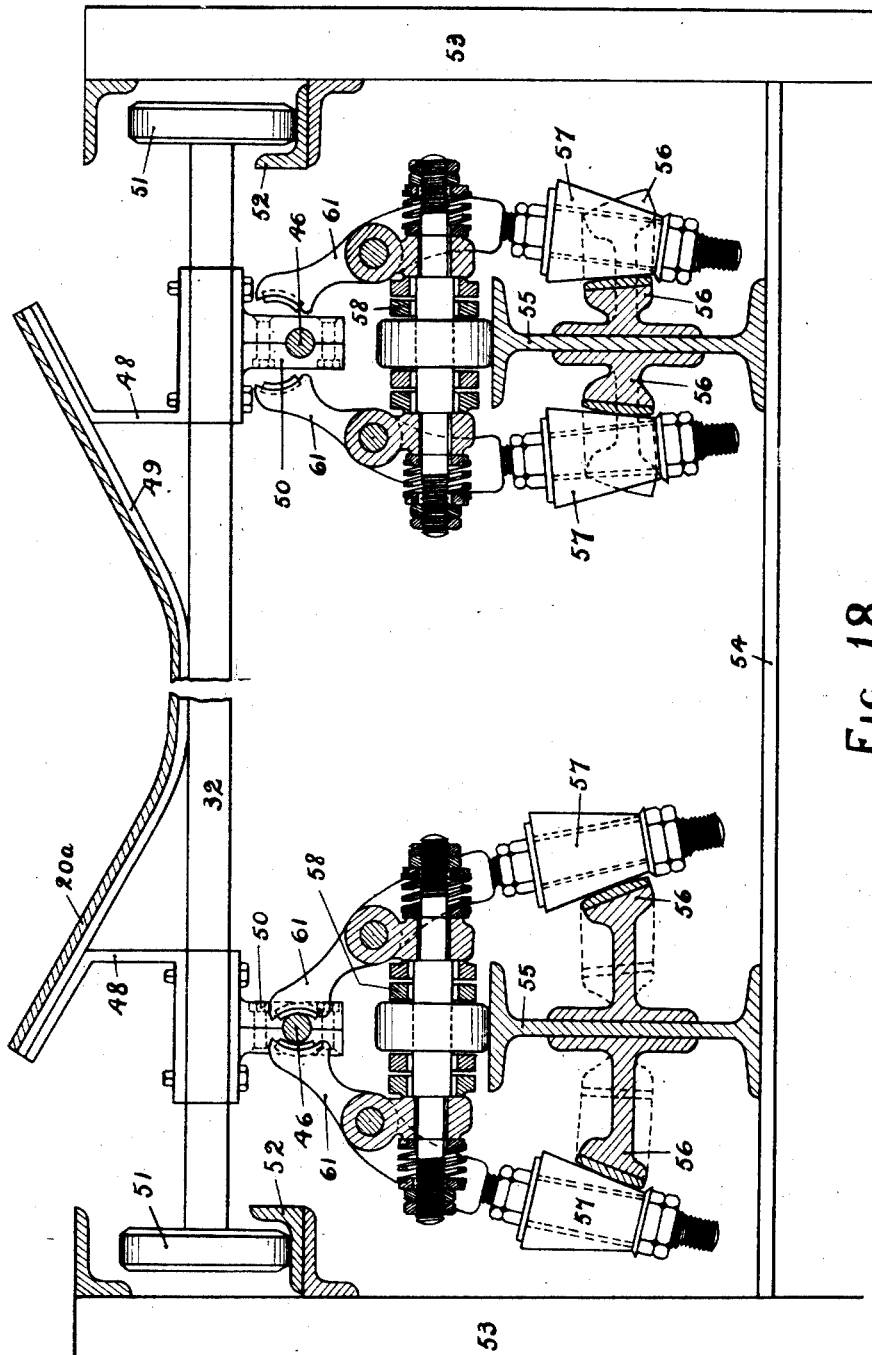
Fig. 18 is a cross-sectional view of part of the conveyer shown in Fig. 13.

Referring firstly more particularly to Figs. 1 to 9 of the drawings, the numeral 20 designates the belt which may be either in one length or in connected sections and which is of only sufficient strength to carry the load of the material, since the transmission of power through the belt 20 is wholly or practically eliminated. The belt 20 is indirectly supported upon and attached to what constitute virtually a pair of endless driving ropes 21 (Fig. 1) through which the driving load is wholly or mainly transmitted. The dead load on the belt 20 is taken by axles 22 which run upon a supporting structure 23. The power is preferably transmitted to the driving ropes by one or more driving units designated $A'$, $A^2$ and $A^3$ in Fig. 1, which consist of endless chains, belts or ropes 43 passing around sprocket wheels 24 and 25, fitted between the upper and lower runs of the conveyer and provided with rope grips, not shown in Fig. 1.

In the construction shown in Figs. 1 to 9, the driving rope 21 consists of a succession of loops $B'$, $B^2$, $B^3$ etc. (Fig. 2), the ends of each loop being connected by swivel connections 26 (Fig. 4) to one of the axles 22. Each axle 22 is provided also with tubular brackets or slip guides 27 through which the bight $21^c$ of one loop is passed so that the rope is free to slip through the guides 27 and allow one limb $21^a$ of the rope loop to adjust itself in relation to the other limb $21^b$ of the loop of rope, and thus adjust itself to any difference in the tension on the two sides of the conveyer. It will be seen that each loop $B'$, $B^2$ etc. is capable of independent self-adjustment in length.

The driving ropes 21 pass around head and tail pulleys 28 and 29 respectively (Figs. 1 and 2) and the tail pulley 29 may have the usual tension adjusting device 30. The belt 20 is supported upon and secured to the axles 22 which may be at relatively great distances apart (say 50 feet), the axles having end rollers 31 (Figs. 3 and 4) which run upon the stationary angle-iron framework 23 and brackets 44 which carry a pair of guide wheels or rollers 45 so arranged that, whilst the axle 22 is free to travel along the track 23, it is prevented from moving out of its true position.

The rope grips carried by the driving units $A'$, $A^2$ etc. may be of the construction illustrated in Figs. 10, 11 and 12 and are adapted to detachably connect the driving ropes 21 to the driving units $A'$, $A^2$ etc. In order to close the gap between the bight $21^c$ of each loop $B'$, $B^2$ etc. and the ends of the limbs $21^a$ and $21^b$ of the next loop, fixed fins 33 (Figs. 3 and 5) are provided under each axle to form a virtual connection between the limbs $21^a$ and $21^b$ respectively of the loops $B'$, $B^2$ etc. In the event of any rope grip therefore coming into action when situated between two of the loops B', B² etc., it will then engage the fin 33.

In Figs. 1 to 9 a flat belt 20 is employed, provided with side plates 34 which act as troughs. The axles 22 are provided with similar plates 34ª to form part of the troughing. The side plates 34 (see Figs. 8 and 9) are connected together in pairs by a cross strap 35 which rests upon the driving ropes 21. The belt 20 passes over the straps 35 and is secured thereto by rivets passing through the belt 20 and straps 35 (see Fig 9). The side plates are offset at 34ᵇ as seen in Fig. 8 so as to overlap each other and avoid gaps when the conveyer is passing over the head pulley, as shown in Fig. 6. The head pulley 28 is preferably formed with peripheral grooves 28ª to receive the driving ropes 21.

The rope grip shown in Figs. 10 to 12 comprises a pair of parallel-movement jaws 36 slidable upon a pair of parallel pins 37 and caused by the pressure of springs 38 to close upon the rope 21. Each jaw 36 coacts with the heel 39ª of a lever 39 pivoted upon a pin 40 and carrying at its end a roller 41 which coacts with a stationary curved rail or cam bar 42 when it is desired to force the jaws 36 apart against the action of the springs 38. The rope grip is mounted on the chain 43, the outer links 43ª of which are combined with a yoke 44 which forms a supporting bracket for the rope grip. The chain 43 passes around the sprockets 24 and 25 (Fig. 1).

From the foregoing description, it will be understood that one or both of the sprockets 24 and 25 of the driving units A', A² etc. derive motion from any suitable source of power and transmit their motion to the endless chains 43 carrying the rope grips 36. By a suitable arrangement of curved rails or cam bars 42, the rope grips 36 are held apart as they pass over the sprockets 25, and when released by disengaging the cam bars 42, the rope grips 36 will engage the driving ropes 21 over the upper run of the chain 43. As the rope grips 36 pass over the sprocket 24 they will engage another cam bar 42 to cause the rope grips to detach themselves from the driving ropes 21 and to subsequently engage (if desired) the lower run of the ropes 21 on the return run of the chain 43. The driving force is thus transmitted to the ropes 21 which run over the head and tail pulleys 28 and 29 and are connected to the axles 22 which support and carry the belt 20. On the return run of the belt 20, the rollers 31 of the axles 22 are supported by the angle-iron framework 23ª.

Figs. 13 to 19 illustrate a construction in which a troughed belt 20ª is employed designed as before to sustain and carry only the load of the material to be transported.

In Fig. 13, the numeral 46 represents one of a pair of parallel endless ropes passing over a head pulley 47 and a tail pulley (not shown). The belt is attached to the ropes 46 by the provision of a series of transverse axles 32, each supporting brackets 48 and a cross-strap or carrier 49 for the belt 20ª and with clamps 50 for securely gripping the ropes 46. The axles 32 are fitted with end rollers 51 which run upon the longitudinal track formed by angle-irons 52 secured to a supporting structure or framework 53, at the lower part of which similar angle-irons (not shown) may be secured to provide a return path for the rollers 51. Supported by the framework 53 upon cross-girders 54 and longitudinal girders 55 are two pairs of oppositely directed longitudinal rails or cam bars 56, each pair of cam bars 56 being adapted to cooperate with the rollers 57 of a series of rope grips G (Fig. 13) mounted on a driving chain 58 which passes over sprockets 59 and 60 disposed between the upper and lower runs of the conveyer.

During part of the travel of the driving chain 58, the rollers 57 engage the cam bars 56 which are curved or converge at one end to allow of easy engagement. The cam bars 56 cause the jaws 61 of the rope grips G to grip the rope 46 and thus transmit the driving power of the chain 58 to the rope 46, compelling it to travel in the same direction.

The rope grips G are fitted upon the chain 58 at predetermined distances apart to suit the distance between the axles 32 and the cam bars 56 are discontinued at a suitable point near the sprockets 59 and 60, so that the load on the conveyer belt 20ª will not be transmitted to the sprockets 59 and 60, and the rope grips G will be free to disengage themselves from the wire rope 46 before reaching the sprockets 59. Similar cam bars (not shown) are provided for the return run of the chain 58, in order that the rope grips G will engage the return run of the ropes 46 and thus maintain the desired tension on the conveyer as it passes over the head pulley 47.

In order to overcome any difference in the stretch of the two endless driving ropes 46, an adjusting device is provided at suitable intervals and the ropes 46 are each formed with opposed loops or bights 46ª (Fig. 14) controlled by a transversely floating device which connects the middle of one bight to the middle of the other bight. The floating device (Figs. 15 and 16) which automatically regulates or compensates the variation in stretch of the ropes 46 comprises a cross-shaft 32ª having end rollers 31ª similar to the axles 51 for running upon the angle-irons 52 and provided also (like the axles 22 of Figs. 1 to 9) with brackets 44ª and guide rollers 45ª to maintain parallel movement of the cross-shaft 32ª. Slidable upon the cross-shaft 32ª is a sleeve 62 having grooved rope guides 63 at each end which engage the bights 46ª in the ropes 46. In the event of one rope being tighter than the other, the sleeve 62 will slide on the cross-shaft 32ª until the slack rope automatically takes the same amount of tension as that transmitted by the other rope.

The head pulley 47 is revolved by the friction of the belt 20ª upon the surface of the pulley and provides a constant and predetermined point of discharge, being provided with slots 47ª to receive the axles 32 and crossshaft 32ª and avoid raising the belt 20ª from the surface of the pulley 47.

From the foregoing description of Figs. 13 to 19, it will be understood that, as one or both of the sprockets 59 and 60 are revolved, the rope grips G of the driving chain 58 will successively engage the ropes 46 and cause the latter to travel in the same direction, thus traversing the axles 32 and conveyer belt 20ª mounted upon the ropes 46. The rope grips 46 will also automatically release their grip of the ropes 46 shortly before they reach the ends of their upper and lower runs, but the ropes 46 and belt 20ª will continue to travel along and over the head pulley 47. The discharge of the material will take place over the head pulley 47 and the ropes 46 and belt 20ª will continue to traverse the pulley 47 and will follow the lower return path until the ropes 46 are re-engaged by the rope grips G of the driving chain 58.

The driving units are of such length that the rope grips will release the ropes over part of their travel, when the ropes together with the belt will be free to return under the tension of other driving units located at suitable intervals, or under the action of gravity if the conveyer is situated in an inclined position.

We thus provide a means of transporting material combining the efficiency of rope haulage with the advantages of the continuous discharge of the conveyer system and by the use of a light belt carrying the load only, we reduce to a minimum the cost of renewals and maintenance, whilst such a system possesses features of exibility in that the endless belt may be run at varying angles or in varying curves as desired without the necessity of discharging the material from one conveyer to another at each change of angle or curvature.

The motive power for the driving units may be electricity, compressed air or steam and the system generally is adaptable either to underground or surface working or a combination of either, as may be found necessary in practice, whilst in systems of considerable length, two or more driving units may be used, such units being introduced at desired points on the system and driven in such a manner that the total driving load on the system is distributed over the conveyer system.

We claim:

1. A conveyer or elevator comprising an endless belt, driving ropes supporting the belt, and one or more rope driving units comprising endless driving elements, and gripping devices for detachably connecting the ropes to said elements.

2. A conveyer or elevator as specified in claim 1 having means for compensating for any difference in the stretch of the ropes.

3. A conveyer or elevator comprising an endless belt and driving ropes each consisting of a succession of loops, and a slip connection between the bight of each loop and the ends of the next loop.

4. A conveyer or elevator as claimed in claim 1 having the driving units situated between the upper and lower runs of the driving ropes.

5. A conveyer or elevator comprising an endless belt, axles upon which the belt is supported, rollers on said axles, a stationary track cooperating with said rollers, whereby the dead load on the belt is transmitted through said axles to the track, and endless driving ropes attached to said axles, one or more rope driving units comprising endless driving elements, and gripping devices for detachably connecting the ropes to said elements.

6. A conveyer or elevator as claimed in claimed in claim 5 having the driving ropes each consisting of a succession of loops, the ends of each loop being attached to one of the axles, and a slip connection on each axle to receive the bight of the next loop.

7. A conveyer or elevator as claimed in claim 5 having the driving ropes each consisting of a succession of loops, the ends of each loop being attached to one of the axles, a slip connection on each axle to receive the bight of the next loop and fins under each axle to bridge the gap between successive loops of rope.

8. A conveyer or elevator as specified in claim 1 having a flat endless belt with side plates attached to said belt to form troughing.

9. A conveyer or elevator as specified in claim 1 having a flat endless belt, and a head pulley driven by frictional contact with the belt and grooved to receive the driving ropes.

10. A conveyer or elevator comprising an endless belt, driving ropes supporting the belt, head and tail pulleys over which the belt and ropes travel, one or more endless driving elements between the upper and lower runs of the belt, rope grips at intervals on each of said driving elements, and mechanism for engaging said grips with and disengaging them from said ropes.

11. A conveyer or elevator comprising an endless belt, a series of transverse axles, rollers on said axles, a track for said rollers, a troughed carrier secured upon each axle and supporting the belt, rope attachments beneath each axle, ropes secured to said axles by said attachments, and mechanism for driving said ropes comprising endless driving elements combined with gripping devices for detachably connecting the ropes to said elements.

12. A conveyer or elevator comprising an endless belt, a pair of parallel endless driving ropes attached at intervals to the belt, head and tail pulleys over which said belt and ropes are passed, and mechanism for traversing said ropes comprising endless driving elements combined with gripping devices for detachably connecting the ropes to said elements.

13. A conveyer or elevator as claimed in claim 11 having the head pulley notched or recessed to enable the belt to revolve the head pulley by friction.

14. A conveyer or elevator as specified in claim 1 having means for guiding the belt to vary the angle or curvature of the conveyer.

15. A conveyer or elevator as specified in claim 1 having mechanism for driving the ropes over part of their travel, so that the belt is free to travel under the action of gravity at inclined portions of the belt.

16. A conveyer or elevator as claimed in claim 5 having the driving ropes each consisting of a succession of loops, a swivel connection between the end of each loop and one of the axles and a slip connection on each axle to receive the bight of a loop.

17. A conveyer or elevator comprising an endless belt, driving ropes attached to the belt to support the latter, and means for driving the ropes consisting of endless chains, belts, ropes or like elements, guide wheels or rollers therefor, means for transmitting motion to said endless elements, rope grips attached to said elements, and cam bars cooperating with said rope grips to engage said grips with or disengage them from the driving ropes.

18. A conveyer or elevator comprising an endless belt, main ropes or cables which support the belt and transmit the drive thereto, means connecting the belt and main ropes or cables, and one or more driving units for driving said main ropes or cables, said driving unit or units comprising auxiliary endless driving chains, belts, ropes or like elements combined with rope grips for detachably connecting the main ropes or cables to the auxiliary driving chains or the like.

19. A conveyer or elevator comprising an endless belt, main ropes or cables which support the belt and transmit the drive thereto, axles supporting the belt and to which the belt is connected, rollers on said axles, a stationary track for said rollers, and one or more driving units for driving said main ropes or cables, said driving unit or units comprising auxiliary endless driving chains, belts, ropes or like elements combined with rope grips for detachably connecting the main ropes or cables to the auxiliary driving chains or the like.

The foregoing specification signed at Glasgow, Scotland this twenty-fifth day of February, 1927.

DAVID RANKINE.
JOHN W. H. ROSS.
THOMAS C. LENNARD.